(12) United States Patent
Yui

(10) Patent No.: US 6,880,797 B2
(45) Date of Patent: Apr. 19, 2005

(54) SAFETY TAP FOR HOT WATER DISPENSER

(76) Inventor: George M. Yui, 260 Scarlet Road, Suite 2013, Toronto, Ontario (CA), M6N 4X6

( * ) Notice: Subject to any disclaimer, the term of this patent is extended or adjusted under 35 U.S.C. 154(b) by 142 days.

(21) Appl. No.: 10/416,376

(22) PCT Filed: Nov. 13, 2001

(86) PCT No.: PCT/CA01/01590

§ 371 (c)(1),
(2), (4) Date: Jun. 13, 2003

(87) PCT Pub. No.: WO02/38995

PCT Pub. Date: May 16, 2002

(65) Prior Publication Data

US 2004/0094736 A1 May 20, 2004

(30) Foreign Application Priority Data

Nov. 13, 2000 (CN) .......................................... 00262760 U

(51) Int. Cl.[7] ........................... F16K 35/02; F16K 31/60
(52) U.S. Cl. ........................................ 251/103; 251/116
(58) Field of Search .................................. 251/101–116

(56) References Cited

U.S. PATENT DOCUMENTS 2,147,287 A  *  2/1939  Farmer ........................ 251/109
5,470,044 A  *  11/1995  Chi ............................. 251/98
6,035,463 A  *  3/2000  Pawelzik et al. ............... 4/677
6,086,045 A  *  7/2000  Moon ....................... 251/335.1
6,367,775 B1 *  4/2002  Nimberger ................... 251/321

FOREIGN PATENT DOCUMENTS

EP          1148278          * 10/2001

* cited by examiner

*Primary Examiner*—Paul J. Hirsch
(74) *Attorney, Agent, or Firm*—Ladas & Parry

(57) ABSTRACT

A child resistant tap has a valve body (12) with an inlet (22) and an outlet (24) and a valve seat (26) therebetween. An axially slidable valve element (28) engages the valve seat (26) to open and close the valve. A handle or lever (1) is pivotally connected to the valve element (28) outside the valve body. The handle has a fulcrum portion (1-2), so that pivotal movement of the handle (1) operates the valve element (28). A safety lever (6) is pivotally attached to the handle (1) and has a locking arm (6-2) which engages the valve body (12) to prevent the handle from pivoting to open the valve. The safety lever (6) also has an actuator arm (6-1) located adjacent to a transverse lever arm (1—1) of the handle, so that squeezing together of the actuator arm (6-1) and the handle lever arm (1—1) causes the safety lever (6) to pivot out of engagement with the valve body (12) allowing the valve to be opened.

8 Claims, 3 Drawing Sheets

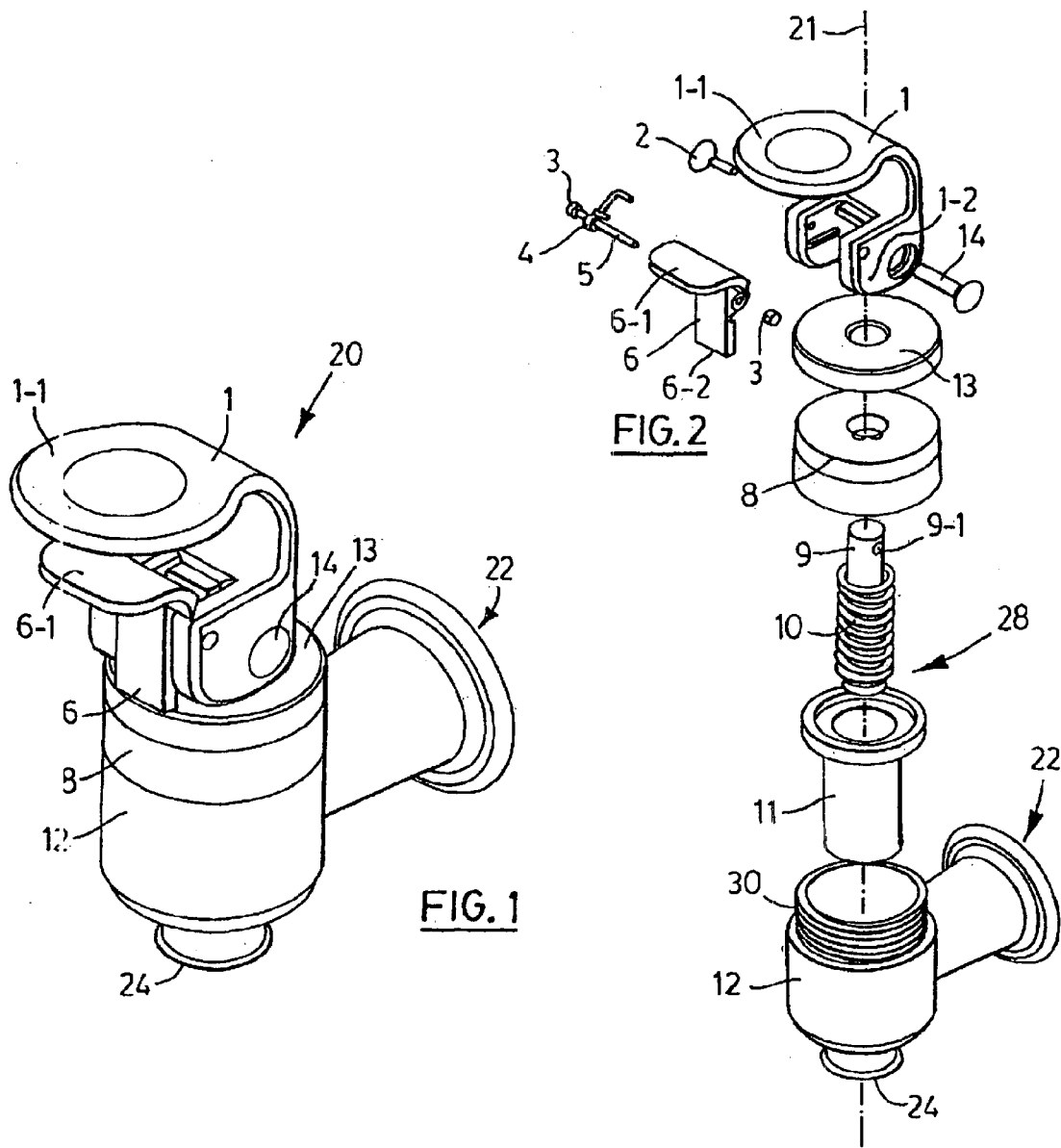

SAFETY TAP FOR HOT WATER DISPENSER

TECHNICAL FIELD

This invention relates to taps or valves for dispensing fluids such as hot water.

BACKGROUND ART

There are many types of valves or taps available for dispensing various liquids. One of these types has a housing with an axially movable spigot or valve element that opens and closes a valve seat to allow or prevent fluid flowing through the valve. Usually the spigot or valve element is biased into engagement with the valve seat, so that the valve is normally closed.

Where the valve is operated manually, it is common to pivotally attach a lever to the valve element. The lever has a fulcrum that bears against some portion of the valve housing, so that upon pivoting of the lever, the valve element is levered or pried into the open position.

Sometimes these types of valves or taps are used to dispense liquids such as hot water or other toxic or dangerous liquids. In such cases, a difficulty with these types of valves is that they are easily accidentally or inadvertently opened, especially by children, with the result that injury can occur.

DESCRIPTION OF THE INVENTION

The present invention provides a lever-type tap or valve that is child resistant in that it cannot be accidentally or inadvertently opened in normal circumstances. The valve has an extra safety lever to resist opening of the valve. The safety lever is very difficult for a child to release due to a lack of dexterity or strength in a child's hands or fingers.

According to the invention, there is provided a safety tap comprising a valve body having a longitudinal axis and a transverse outer body portion. The valve body has an inlet, an outlet and a valve seat located therebetween in communication therewith. A valve element slidably extends through the outer body portion along the longitudinal axis for axial movement to block the valve seat in a tap closed position and unblock the valve seat in a top open position. Bias means are provided for urging the valve element toward the closed position. A handle is pivotally connected to the valve element outside the valve body. The handle has a distal portion and a fulcrum portion transversely spaced from the valve element, so that pivoting of the handle toward the fulcrum portion causes the fulcrum portion to engage the outer body portion and lever the valve element toward the tap open position. A safety lever is pivotally mounted on the handle. The safety lever has a locking arm located outwardly of the handle fulcrum portion and extends generally parallel to the valve element to engage the outer body portion. The locking arm is spaced sufficiently outwardly of the handle fulcrum portion generally to prevent tap opening pivotal movement of the handle distal portion. The safety lever also has an actuator arm spaced from the handle distal portion, so that squeezing together the handle distal portion and the safety lever actuator arm causes the safety lever locking arm to pivot out of engagement with the outer body portion allowing the handle to be pivoted to open the safety tap. Also, means are provided for biasing the safety lever locking arm into engagement with the outer body portion.

BRIEF DESCRIPTION OF THE DRAWINGS

Preferred embodiments of the invention will now be described, by way of example, with reference to the accompanying drawings, in which:

FIG. 1 is a perspective view of a preferred embodiment of a safety tap according to the present invention;

FIG. 2 is an exploded perspective view of the safety tap shown in FIG. 1;

BEST MODE FOR CARRYING OUT THE INVENTION

Figure 3:
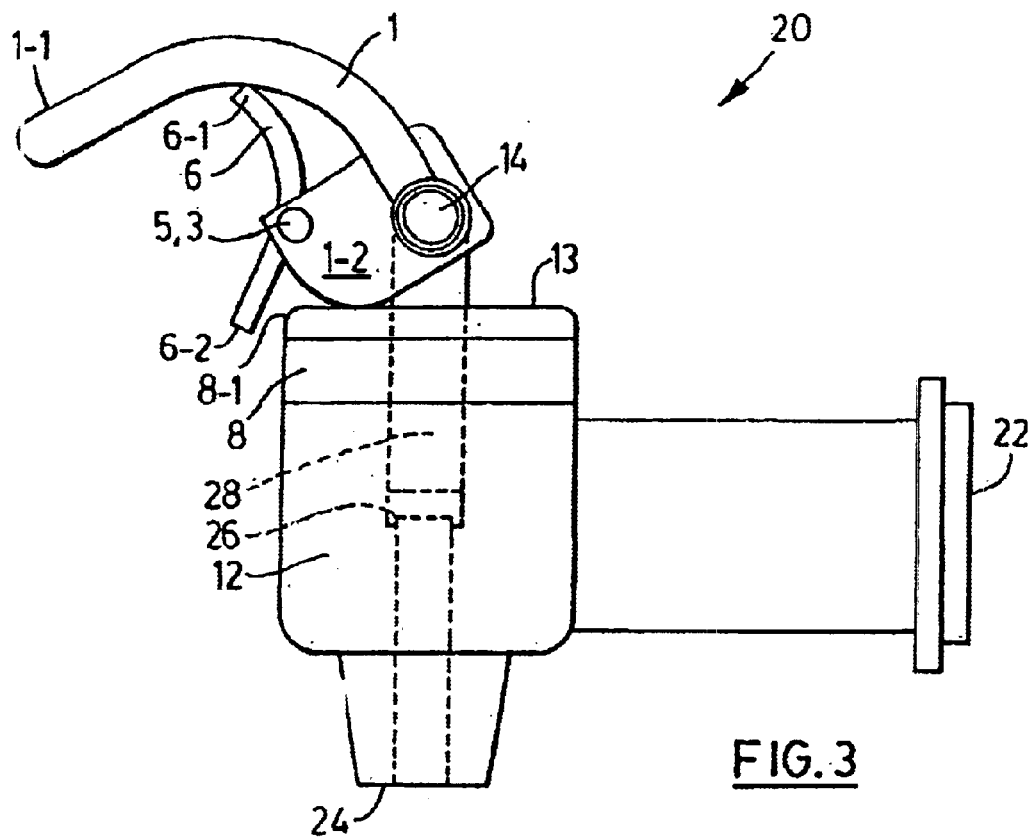
FIG. 3 is a side view of the safety tap of FIG. 1 showing the safety tap in the open position.

Referring firstly to FIGS. 1 to 4, a preferred embodiment of a safety tap according to the present invention is generally indicated by reference numeral 20. Safety tap 20 includes a valve body 12, preferably made of plastic, having a longitudinal axis 21 and a transverse outer body portion 13. Transverse outer body portion 13 is located on top of an internally female-threaded body portion 8 which screws onto male threads 30 of the main valve body portion 12. Transverse outer body portion 13 acts as a bearing or washer and is made of metal or a suitable plastic material for this purpose. Valve body 12 has an inlet 22, an outlet 24 and a transverse annular valve seat 26 (see FIG. 3) located between inlet 22 and outlet 24 in communication with inlet 22 and outlet 24.

Figure 4:
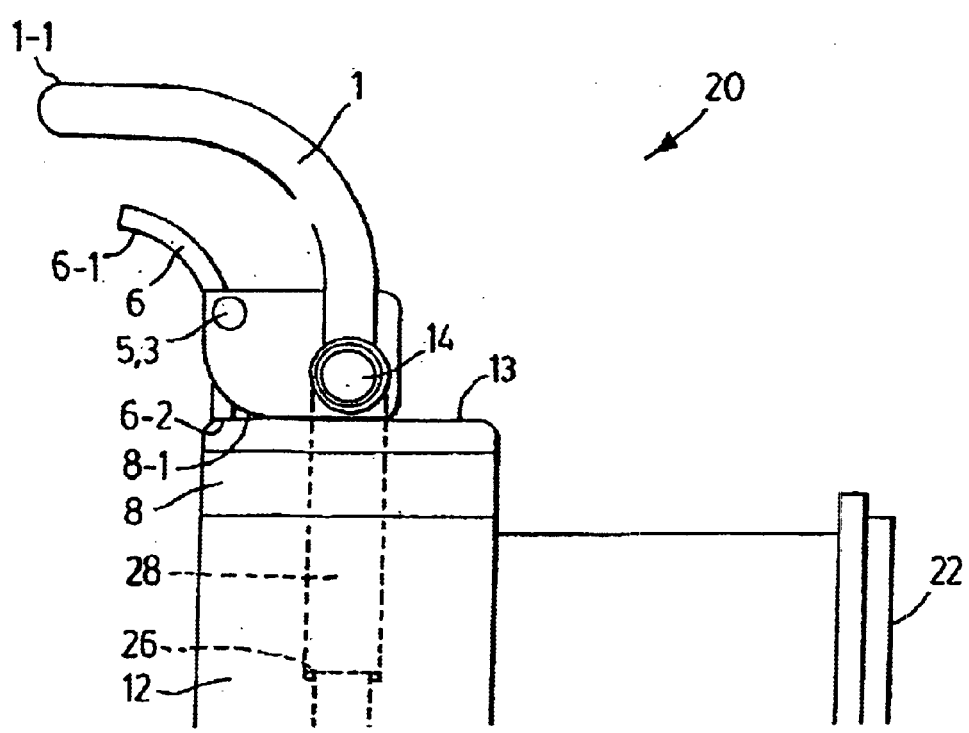
FIG. 4 is a side view similar to FIG. 3 but showing the safety tap in the closed position.

A valve element 28 includes a central shaft 9 on which is mounted a silicone rubber sealing element 11 which actually engages and closes valve seat 26. Central shaft 9 of valve element 28 is preferably made of metal, or a combination of metal and plastic, and slidably extends through the outer body portion 13 and female threaded body portion 8. Central shaft 9 is located along longitudinal axis 21 for axial movement to block or close the valve seat 26 in a tap closed position as shown in FIG. 4, and to unblock or open the valve seat 26 in a tap open position as shown in FIG. 3. Bias means in the form of a coil spring 10 is located concentrically over central shaft 9 to urge the valve element 28 toward the closed position.

A plastic handle 1 is pivotally connected to central shaft 9 of valve element 28 outside the valve body 12 by a pivot pin 14 passing through a transverse opening 9-1 in central shaft 9. A retainer 2 is press fitted into pivot pin 14 to hold pivot 14 in place and prevent handle 1 from coming off central shaft 9. Alternatively, a rivet could be used in place of pivot pin 14 and retainer 2.

Handle 1 has a distal portion or transverse lever arm 1-1 and a fulcrum portion 12 that bears against transverse outer body portion 13. Fulcrum portion 1-2 is transversely spaced from the valve element central shaft 9, so that pivoting of the handle 1 toward the fulcrum portion 1-2 causes the fulcrum portion 1-2 to engage the outer body portion 13 and lever the valve element 28 upwardly toward the tap open position.

A plastic or metal safety lever 6 is pivotally mounted on handle 1 by a safety lever pivot pin 5 with associated retainer end caps 3. However, a rivet could be used in place of pivot pin 5 and end caps 3.

Safety lever 6 has a locking arm 6-2 located outwardly of the handle fulcrum portion 1-2 and extends generally parallel to the valve element 28 to engage the outer body portion 13. Locking arm 6-2 is transversely spaced sufficiently outwardly of the handle fulcrum portion 1-2 to prevent tap opening pivotal movement of the handle distal portion 1-1 under normal circumstances. Safety lever 6 also has an actuator arm 6-1 transversely disposed, spaced from and located generally parallel to handle transverse lever arm 1-1, so that squeezing together the handle distal portion 1-1 and the safety lever actuator arm 6-1 causes the safety lever locking arm 6-2 to pivot out of engagement with the outer body portion 13 for allowing the handle 1 to be pivoted downwardly to open safety tap 20, as illustrated in FIG. 3. A torsion spring 4 (see FIG. 2) is means for biasing the safety lever locking arm 6-2 into engagement with the outer body portion 13.

Referring in particular to FIGS. 3 and 4, safety tap 20 is in the closed position in FIG. 4. To open the tap, handle distal portion 1-1 and actuator arm 6-1 are grasped, respectively, by the thumb and forefinger. In the tap closed position, the lower end of safety lever locking arm 6-2 is located adjacent to and on top of a peripheral edge portion 8-1 of valve body portion 13 or 8. This peripheral edge portion 8-1 surrounds the transverse outer body portion 13. When the handle transverse lever arm 1-1 and actuator arm 6-1 are squeezed together, the lower end of locking arm 6-2 moves outwardly to clear the peripheral edge portion 8-1 and allow the handle to be pivoted downwardly to pry up valve element 28 and open safety tap 20. It will be appreciated that safety lever pivot pin 5 and 3 is spaced away from or above the outer body portion 13, so that pivoting of the safety lever 6 causes the locking arm 6-2 to swing outwardly to clear the peripheral edge portion 8-1.

It will be appreciated that as the handle 1 is pivoted downwardly, the fulcrum portion 1-2 tends to move inwardly toward the longitudinal axis 21, but the lower edges of fulcrum portion 1-2 can be rounded to minimize the effect of this movement. However, the fulcrum portion 1-2 is located transversely between the handle pivot pin 14 and the safety lever pivot pin 5,3. Handle fulcrum portion 1-2 can be located closer to the handle pivot pin 14 then to the safety lever pivot pin 5, if desired. The position of fulcrum portion 1-2 will determine the travel of valve element 28 and also how much force is required to open safety tap 20. The spring constant of coil spring 10 also affects this. These factors, together with the spring constant of torsion spring 4 are chosen such that safety tap 20 can easily be manipulated by an adult, but not by a small child.

Handle 1 is also made from a resilient plastic material with sufficient rigidity to open safety tap 20 when safety lever 6 is depressed, but transverse lever arm 1-1 will deform upon the exertion of excessive force thereto. This prevents the handle 1 from pivoting about the point of contact of the lower end of locking arm 6-2 with peripheral edge portion 8-1 of outer body portion 13.

Figure 5:
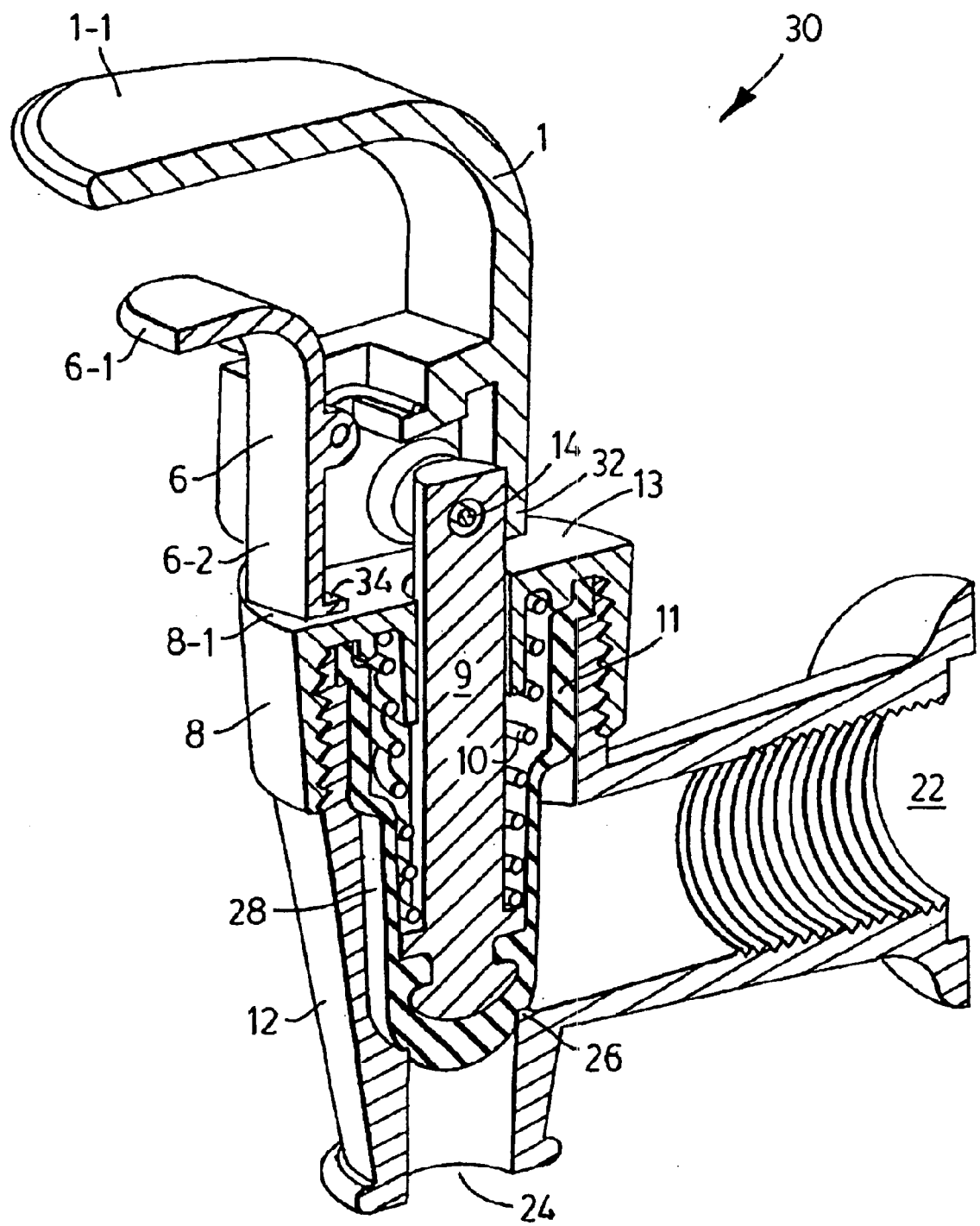
FIG. 5 is an enlarged perspective view, partly broken away, showing another preferred embodiment of a safety tap according to the present invention.

Referring next to FIG. 5, a safety tap 30 is shown having a one piece upper or outer body portion 13 instead of the two piece construction shown in FIGS. 1 to 4. Also, in this embodiment, handle 1 has an optional back arm 32 located on the side of the longitudinal axis of the tap remote from the safety lever 6. The back arm 32 engages central shaft 9 of valve element 28 for one-way pivoting of handle 1 toward safety lever 6. Back arm 32 could also engage outer body portion 13, but in such case, it should be located trasversely outwardly to the peripheral edge portion 8-1, so that safety tap 30 cannot accidentally be opened by pushing upwardly on the handle transverse lever arm 1-1.

FIG. 5 also shows an optional additional foot 34 on the bottom of locking arm 6-2. Foot 34 ensures that locking arm 6-2 cannot disengage or slip off accidentally from peripheral edge portion 8-1.

As will be apparent to those skilled in the art in the light of the foregoing disclosure, many alterations and modifications are possible in the practice of this invention without departing from the spirit or, scope thereof. The foregoing description is of the preferred embodiments and is by way of example only, and is not to limit the scope of the invention.

What is claimed is:

1. A safety tap comprising: a valve body having a longitudinal axis and a transverse outer body portion; the valve body having an inlet, an outlet and a valve seat located therebetween in communication therewith; a valve element slidably extending through the outer body portion along the longitudinal axis for axial movement to block the valve seat in a tap closed position and unblock the valve seat in a tap open position; bias means for urging the valve element toward the closed position; a handle pivotally connected to the valve element outside the valve body, the handle having a distal portion and a fulcrum portion transversely spaced from the valve element, so that pivoting of the handle toward the fulcrum portion causes the fulcrum portion to engage the outer body portion and lever the valve element toward the tap open position; a safety lever pivotally mounted on the handle, the safety lever having a locking arm located outwardly of the handle fulcrum portion and extending generally parallel to the valve element to engage the outer body portion, the locking arm being spaced sufficiently outwardly of the handle fulcrum portion generally to prevent tap opening pivotal movement of the handle distal portion; the safety lever also having an actuator arm spaced from the handle distal portion, so that squeezing together the handle distal portion and the safety lever actuator arm causes the safety lever locking arm to pivot out of engagement with the outer body portion allowing the handle to be pivoted to open the safety tap; and means for biasing the safety lever locking arm into engagement with the outer body portion.

2. A safety tap as claimed in claim 1 wherein the handle is pivotally connected to the valve element by a handle pivot pin, the safety lever is pivotally mounted on the handle by a safety lever pivot pin spaced transversely outwardly from the handle pivot pin, and the handle fulcrum portion is located between the handle pivot pin and the safety lever pivot pin.

3. A safety tap as claimed in claim 2 wherein the handle fulcrum portion is located closer to the handle pivot pin than to the safety lever pivot pin.

4. A safety tap as claimed in claim 2 wherein the valve body has a peripheral edge portion surrounding the transverse outer body portion, the safety lever locking arm being located adjacent to the peripheral edge portion.

5. A safety tap as claimed in claim 4 wherein the safety lever pivot pin is spaced away from the outer body portion, so that pivoting of the safety lever causes the locking arm to swing outwardly to clear the peripheral edge portion and allow the handle to be pivoted to open the tap.

6. A safety tap as claimed in claim 2 wherein the handle distal portion has a transverse lever arm, the safety lever actuator arm is also transversely disposed and located generally parallel to the handle lever arm, so that the handle lever and safety lever actuator can be squeezed together with the thumb and forefinger.

7. A safety tap as claimed in claim 1 wherein the handle further comprises a back arm located on the side of the longitudinal axis remote from the safety lever, the back arm engaging one of the outer body portion and the valve element for one-way pivoting of the handle toward the safety lever.

8. A safety tap as claimed in claim 6 wherein the handle distal portion is formed of a resilient material to deform upon the exertion of excessive force thereto, to prevent the handle from pivoting about the point of contact of the locking arm and the outer body portion when the safety lever is in the locking position.

* * * * *